United States Patent
Yang et al.

(10) Patent No.: US 9,056,979 B2
(45) Date of Patent: Jun. 16, 2015

(54) BIODEGRADABLE POLYESTER MIXTURE

(71) Applicant: BASF SE, Ludwigshafen (DE)

(72) Inventors: Xin Yang, Shanghai (CN); Jörg Auffermann, Freinsheim (DE); Carsten Sinkel, Mannheim (DE); Jerome Lohmann, Landau (DE); Robert Loos, Ludwigshafen (DE); Gabriel Skupin, Speyer (DE); Andreas Künkel, Neustadt (DE); Lars Börger, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/074,772

(22) Filed: Nov. 8, 2013

(65) Prior Publication Data

US 2014/0134363 A1  May 15, 2014

Related U.S. Application Data

(60) Provisional application No. 61/726,606, filed on Nov. 15, 2012.

(51) Int. Cl.
| | |
|---|---|
| B29C 65/00 | (2006.01) |
| B29D 22/00 | (2006.01) |
| B29D 23/00 | (2006.01) |
| B32B 1/08 | (2006.01) |
| C08L 67/02 | (2006.01) |
| C08L 67/03 | (2006.01) |
| C08L 67/00 | (2006.01) |
| C08K 3/00 | (2006.01) |
| C08J 5/18 | (2006.01) |
| C08G 63/00 | (2006.01) |

(52) U.S. Cl.
CPC .............. *C08L 67/02* (2013.01); *C08L 67/03* (2013.01); *C08L 67/00* (2013.01); *C08K 3/00* (2013.01); *B32B 1/08* (2013.01); *B29D 23/00* (2013.01); *B29D 22/00* (2013.01); *B29C 65/00* (2013.01); *C08J 5/18* (2013.01); *C08G 63/00* (2013.01)

(58) Field of Classification Search
CPC ......... C08L 67/00; C08L 67/03; C08G 63/00; C08J 5/18; C08K 3/00; B29C 65/00; B29D 22/00; B29D 23/00; B32B 1/08
USPC .............. 428/35.5, 36.92, 136, 221; 524/425; 442/202, 365, 1
See application file for complete search history.

(56) References Cited

U.S. PATENT DOCUMENTS

| | | | |
|---|---|---|---|
| 5,286,770 A | 2/1994 | Bastioli et al. | |
| 5,817,721 A | 10/1998 | Warzelhan et al. | |
| 5,863,991 A | 1/1999 | Warzelhan et al. | |
| 5,874,486 A | 2/1999 | Bastioli et al. | |
| 5,880,220 A | 3/1999 | Warzelhan et al. | |
| 5,889,135 A | 3/1999 | Warzelhan et al. | |
| 6,018,004 A | 1/2000 | Warzelhan et al. | |
| 6,046,248 A | 4/2000 | Warzelhan et al. | |
| 6,111,058 A | 8/2000 | Warzelhan et al. | |
| 6,120,895 A | 9/2000 | Kowitz et al. | |
| 6,258,924 B1 | 7/2001 | Warzelhan et al. | |
| 6,353,084 B1 | 3/2002 | Warzelhan et al. | |
| 2007/0123612 A1 | 5/2007 | Bastioli et al. | |
| 2011/0039999 A1 | 2/2011 | Witt et al. | |
| 2011/0187029 A1 | 8/2011 | Dietrich et al. | |
| 2012/0219740 A1 | 8/2012 | Bastioli et al. | |
| 2013/0214455 A1 | 8/2013 | Siegenthaler et al. | |

FOREIGN PATENT DOCUMENTS

| | | |
|---|---|---|
| EP | 0539541 A1 | 5/1993 |
| EP | 0575349 A1 | 12/1993 |
| EP | 652910 A1 | 5/1995 |
| EP | 937120 A2 | 8/1999 |
| EP | 947559 A2 | 10/1999 |
| EP | 965615 A1 | 12/1999 |
| WO | WO-92/09654 A2 | 6/1992 |
| WO | WO-92/14782 | 9/1992 |
| WO | WO-92/19680 | 11/1992 |
| WO | WO 94/03543 | 2/1994 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/21689 A2 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25448 A1 | 8/1996 |
| WO | WO-9812242 A1 | 3/1998 |
| WO | WO-98/20073 | 5/1998 |
| WO | WO-2006/097353 A1 | 9/2006 |
| WO | WO-2006/097354 A1 | 9/2006 |
| WO | WO-2009071475 A1 | 6/2009 |
| WO | WO-2009/127556 A1 | 10/2009 |
| WO | WO-2010/034710 A1 | 4/2010 |
| WO | WO-2010/034711 A1 | 4/2010 |

*Primary Examiner* — Michael C Miggins

(74) *Attorney, Agent, or Firm* — Drinker Biddle & Reath LLP

(57) ABSTRACT

Disclosed is a biodegradable polyester mixture comprising 45 to 95 wt %, based on the total weight of polyester I and II, of a polyester I constructed from an aliphatic $C_9$-$C_{18}$ dicarboxylic acid or a $C_9$-$C_{18}$ dicarboxylic acid derivative; terephthalic acid or a terephthalic acid derivative; a $C_3$-$C_6$ diol; an at least trihydric alcohol; and a chain extender. The biodegradable polyester mixture further comprises 5 to 55 wt %, based on the total weight of polyester I and II, of a polyester II constructed from an aliphatic $C_4$-$C_6$ dicarboxylic acid or a $C_4$-$C_6$ dicarboxylic acid derivative; terephthalic acid or a terephthalic acid derivative; a $C_3$-$C_6$ diol; an at least trihydric alcohol; and a chain extender. The biodegradable polyester mixture further comprises 10 to 25 wt %, based on the total weight, of calcium carbonate; and 3 to 15 wt %, based on the total weight, of talc.

15 Claims, No Drawings

BIODEGRADABLE POLYESTER MIXTURE

CROSS-REFERENCE TO RELATED APPLICATIONS

This application claims benefit (under 35 USC 119(e)) of U.S. Provisional Application Ser. No. 61/726,606, filed Nov. 15, 2012, which is incorporated herein by reference in its entirety.

The invention relates to a biodegradable polyester mixture comprising:
- i) 45 to 95 wt %, based on the total weight of components i and ii, of a polyester I constructed from:
  - a-1) 40 to 70 mol %, based on components a and b, of an aliphatic $C_9$-$C_{18}$ dicarboxylic acid or of a $C_9$-$C_{18}$ dicarboxylic acid derivative;
  - b-1) 30 to 60 mol %, based on components a and b, of terephthalic acid or of a terephthalic acid derivative;
  - c-1) 98 to 100 mol %, based on components a and b, of a $C_3$-$C_6$ diol;
  - d-1) 0 to 2 wt %, based on the total weight of components a and b, of an at least trihydric alcohol;
  - e-1) 0 to 2 wt %, based on the total weight of components a to e, of a chain extender;
- ii) 5 to 55 wt %, based on the total weight of components i and ii, of a polyester II constructed from:
  - a-2) 40 to 70 mol %, based on components a and b, of an aliphatic $C_4$-$C_6$ dicarboxylic acid or of a dicarboxylic acid derivative;
  - b-2) 30 to 60 mol %, based on components a and b, of terephthalic acid or of a terephthalic acid derivative;
  - c-2) 98 to 100 mol %, based on components a and b, of a $C_3$-$C_6$ diol;
  - d-2) 0 to 2 wt %, based on the total weight of components a and b, of an at least trihydric alcohol;
  - e-2) 0 to 2 wt %, based on the total weight of components a to e, of a chain extender;
- iii) 10 to 25 wt %, based on the total weight of the polymer mixture i to iv, of calcium carbonate; and
- iv) 3 to 15 wt %, based on the total weight of the polymer mixture i to iv, of talc.

The present invention further relates to the use of these polyester mixtures.

Biodegradable polyesters such as poly(butylene adipate-co-terephthalate) (PBAT) are known from WO-A 96/015173 for example. WO-A 2010/034710 describes polyesters such as poly(butylene sebacate-co-terephthalate) (PBSeT).

Biodegradability in these references refers to compostability within the meaning of DIN EN 13432. Composting in this sense relates to industrial composters and is to be understood as meaning that a material when exposed for a defined period to defined temperature, oxygen and moisture conditions in the presence of microorganisms shall have degraded to more than 90 percent into water, carbon dioxide and biomass.

Domestic garden composting generally involves a lower temperature, so garden waste takes distinctly longer to rot down and correspondingly the degradation rates of the plastic tested are distinctly lower. ISO 20200 (2004) is an internationally standardized test for domestic garden composting.

DIN EN ISO 17556 was developed to determine ultimate aerobic biodegradability in the soil. Ultimate degradation in the soil is especially important for plastics applications in the agrisector such as, for example, mulch films, covering films, silo films, slit film tapes, wovens, nonwovens, clips, textiles, threads, fishing nets, secondary packaging, heavy-duty bags and flowerpots. Foam applications as for soil aeration must also be considered. The soil degradation performance of polyesters described in the literature is not always up to the mark.

The present invention accordingly has for its object to provide polymers that satisfy the material prerequisites for state-of-the-art extrusion and injection-molding applications while also having good soil degradability.

We have found that this object is achieved by the above-mentioned biodegradable polyester mixture comprising:
- i) 45 to 95 wt %, based on the total weight of components i and ii, of a polyester I constructed from:
  - a-1) 40 to 70 mol %, based on the total weight of components a and b, of an aliphatic $C_9$-$C_{18}$ dicarboxylic acid or of a $C_9$-$C_{18}$ dicarboxylic acid derivative;
  - b-1) 30 to 60 mol %, based on components a and b, of terephthalic acid or of a terephthalic acid derivative;
  - c-1) 98 to 100 mol %, based on components a and b, of a $C_3$-$C_6$ diol;
  - d-1) 0 to 2 wt %, based on components a and b, of an at least trihydric alcohol;
  - e-1) 0 to 2 wt %, based on the total weight of components a to e, of a chain extender;
- ii) 5 to 55 wt %, based on the total weight of components i and ii, of a polyester II constructed from:
  - a-2) 40 to 70 mol %, based on components a and b, of an aliphatic $C_4$-$C_6$ dicarboxylic acid or of a dicarboxylic acid derivative;
  - b-2) 30 to 60 mol %, based on components a and b, of terephthalic acid or of a terephthalic acid derivative;
  - c-2) 98 to 100 mol %, based on components a and b, of a $C_3$-$C_6$ diol;
  - d-2) 0 to 2 wt %, based on the total weight of components a and b, of an at least trihydric alcohol;
  - e-2) 0 to 2 wt %, based on the total weight of components a to e, of a chain extender;
- iii) 10 to 25 wt %, based on the total weight of the polymer mixture i to iv, of calcium carbonate; and
- iv) 3 to 15 wt %, based on the total weight of the polymer mixture i to iv, of talc.

Biodegradable films of polyester can be used as mulch films for example. The decisive requirements for this are not only tongue tear strength but also stability to sunlight in the case of transparent mulch films in particular. Mulch films colored black (with carbon black) already have a UV-absorbed effect, yet thermal radiation is also absorbed, which means that less heat gets through to the soil and the yield/harvest advancement effect that can be achieved, at least for particular crops such as melons and maize, is accordingly higher.

WO 2009/071475 discloses mulch films based on polyethylene for example, which comprise hydroxyphenyltriazines as a stabilizer. Biodegradable films of polyester are not explicitly described in WO 2009/071475. The service life of biodegradable transparent mulch films based on a biodegradable polyester consisting of aliphatic and/or aromatic dicarboxylic acids and an aliphatic dihydroxy compound is often too short: only 2 weeks, depending on wall thickness. Light stabilizers such as UV absorbers and HALS stabilizers, or a combination thereof, are usually recommended for the UV stabilization of mulch films. UV absorbers work by filtering the ultraviolet portion of the light out of the light, so the energy of the absorbed light is converted into heat. HALS stabilizers work by suppressing the reaction of photooxidatively generated scission products in the polymer. When the active ingredients referred to are combined, a synergistic effect is achieved to inhibit the two different mechanisms of degradation. Studies on Ecoflex® partly aromatic polyester (BASF SE) have revealed that hydroxyphenyltriazine-based UV absorbers such as Tinuvin® 1577 used alone or combined with a HALS stabilizer such as Tinuvin® 111 or UV absorbers based on benzophenones such as Uvinul® 3008 do provide a certain stabilizing effect, but that this stabilizing effect is substantially insufficient for transparent mulch films, especially at low wall thickness.

Tongue tear strength of these mulch films is also unsatisfactory, especially in thin versions (below 30 microns).

The present invention accordingly further has for its object to provide biodegradable, preferably transparent mulch films having longer service lives in the field (above ground), higher tongue tear strength and at the same time ultimate degradation in the soil (below ground).

We have found that this object is achieved by a polyester mixture which in addition to components i to iv of the present invention comprises the UV absorber 2-(4,6-bis-biphenyl-4-yl-1,3,5-triazin-2-yl)-5-(2-ethyl-(n)-hexyloxy)phenol, and is particularly useful for agricultural applications.

The present invention will now be more particularly described.

In principle, biodegradable polyester mixtures of the present invention are obtainable using as component i any polyester I and as component ii any polyester II based on aliphatic and aromatic dicarboxylic acids and an aliphatic dihydroxy compound, which are known as partly aromatic polyesters. A feature shared by these polyesters is the fact that they are biodegradable within the meaning of DIN EN 13432. The essential difference between polyesters I and II is the chain length of aliphatic dicarboxylic acid a.

Partly aromatic polyesters (components i and ii) for the purposes of the present invention also include polyester derivatives comprising a small proportion of sub-structures such as polyetheresters, polyesteramides, polyetheresteramides or polyesterurethanes. Suitable partly aromatic polyesters include linear polyesters (WO 92/09654). Partly aromatic polyesters that are branched and/or chain extended are preferred. Branched partly aromatic polyesters are known from the references cited above, WO 96/15173 to 15176, 21689 to 21692, 25446, 25448 or WO 98/12242, which are hereby expressly incorporated herein by reference. Mixtures of different partly aromatic polyesters are also useful. Interesting recent developments are based on renewable raw materials (see WO-A 2006/097353, WO-A 2006/097354 and WO-A 2010/034710).

Polyesters I and II of the present invention are preferably obtained by the process described in WO 2009/127556. The process described therein is suitable in that the gentle method of operation provides polyesters that combine a high viscosity with a low acid number. The low acid number is a prerequisite for efficient reaction with diisocyanates, so the low MVR values of the present invention are obtainable in a simple and methodical manner. Polyesters having a melt volume rate (MVR) to EN ISO 1133 (190° C., 2.16 kg weight) of 0.5 to 6.0 cm$^3$/10 min and especially of 0.8 to 5 cm$^3$/10 min will to be particularly useful in the manufacture of very thin films that combine tongue tear strength with penetration resistance.

The continuous process described in WO 2009/127556 will now be more particularly elucidated. For example, a mixture of 1,4-butanediol, sebacic acid, terephthalic acid and optionally further comonomers, but no catalyst, is mixed to form a paste or, alternatively, the liquid esters of the dicarboxylic acids and the dihydroxy compound and optionally further comonomers, but no catalyst, is fed into the reactor and 1. in a first step, this mixture is continuously esterified or, respectively, transesterified together with all or some of the catalyst;
2. in a second stage, the esterification/transesterification product obtained as per 1.) is, if appropriate together with the rest of the catalyst, precondensed continuously—preferably in a tower reactor where the product stream passes cocurrently over a falling-film cascade and the reaction vapors are removed in situ from the reaction mixture—to a DIN 53728 viscosity number of 20 to 60 mL/g;
3. in a third stage, the product obtainable from 2.) is continuously polycondensed—preferably in a cage reactor, to a DIN 53728 viscosity number of 70 to 130 mL/g; and
4. in a fourth stage, the product obtainable from 3.) is continuously reacted with a chain extender in a polyaddition reaction in an extruder, a List reactor or a static mixer as far as a DIN 53728 viscosity number of 160 to 250 mL/g.

The continuous process described in WO 2009/127556 provides aliphatic-aromatic polyesters having a DIN EN 12634 acid number of less than 1.0 mg KOH/g and a viscosity number of above 130 mL/g, and also an ISO 1133 MVR of not more than 6 cm$^3$/10 min (190° C., 2.16 kg weight).

Polyesters I preferably have the following construction:
- a-1) 40 to 70 mol %, based on components a and b, of an aliphatic $C_9$-$C_{18}$ dicarboxylic acid or of a $C_9$-$C_{18}$ dicarboxylic acid derivative;
- b-1) 30 to 60 mol %, based on components a and b, of terephthalic acid or of a terephthalic acid derivative;
- c-1) 98 to 100 mol %, based on components a and b, of a $C_3$-$C_6$ diol;
- d-1) 0 to 2 wt %, based on the total weight of components a and b, of an at least trihydric alcohol;
- e-1) 0 to 2 wt %, based on the total weight of components a to e, of a chain extender.

$C_9$-$C_{18}$ Dicarboxylic acid (component a-1) is preferably azelaic acid, sebacic acid, brassylic acid, a $C_{18}$ 1,18-dicarboxylic acid or the corresponding dicarboxylic acid derivative. Sebacic acid and its derivatives are particularly useful as component a-1. The abovementioned diarboxylic acids these days are available from renewable raw materials.

Aliphatic dicarboxylic acid (a) and terephthalic acid (b) can be used either as free acid or in the form of ester-forming derivatives. Useful ester-forming derivatives include particularly the di($C_1$-$C_6$ alkyl) esters, such as dimethyl, diethyl, di-n-propyl, diisopropyl, di-n-butyl, diisobutyl, di-t-butyl, di-n-pentyl, diisopentyl or di-n-hexyl esters. Anhydrides of dicarboxylic acids can likewise be used.

The dicarboxylic acids or their ester-forming derivatives can be used individually or in the form of a mixture.

In general, at the start of the polymerization, diol (c) is adjusted relative to the diacids (a and b) such that the ratio of diols to diacids is in the range from 1.0 to 2.5:1 and preferably in the range from 1.3 to 2.2:1. Excess quantities of diol are withdrawn during the polymerization, so an approximately equimolar ratio becomes established at the end of the polymerization. By "approximately equimolar" is meant a diol/diacids ratio in the range from 0.98 to 1.0:1.

Useful at least trihydric alcohols (d) include, for example, 1,1,1-trimethylolpropane, 1,1,1-trimethylolethane, pentaerythritol, polyether triols and especially glycerol. Components d can be used to construct biodegradable polyesters i having structural viscosity. Melt rheology improves in that the biodegradable polyesters become easier to process, for example easier to pull into self-supporting films/sheets by melt solidification.

Chain extenders e are polyfunctional and especially difunctional isocyanates, isocyanurates, oxazolines, carboxylic anhydrides or epoxides.

The term "epoxides" is to be understood as meaning particularly epoxy-containing copolymer based on styrene, acrylic ester and/or methacrylic ester. The units which bear epoxy groups are preferably glycidyl (meth)acrylates. Copolymers having a glycidyl methacrylate content of greater than 20, more preferably greater than 30 and even more preferably greater than 50 wt % of the copolymer will be found particularly advantageous. The epoxy equivalent weight (EEW) in these polymers is preferably in the range from 150 to 3000 and more preferably in the range from 200 to 500 g/equivalent. The weight-average molecular weight $M_w$ of the polymers is preferably in the range from 2000 to 25 000 and particularly in the range from 3000 to 8000. The number average molecular weight $M_n$ of the polymers is preferably in the range from 400 to 6000 and particularly in the range from 1000 to 4000. The polydispersity (Q) is generally between 1.5 and 5. Epoxy-containing copolymers of the abovementioned type are commercially available, for example from BASF Resins B.V. under the Joncryl® ADR brand. Joncryl® ADR 4368 is particularly useful as chain extender.

Useful bifunctional chain extenders e include the following compounds:

An aromatic diisocyanate comprises in particular tolylene 2,4-diisocyanate, tolylene 2,6-diisocyanate, 2,2'-diphenylmethane diisocyanate, 2,4'-diphenylmethane diisocyanate, 4,4'-diphenylmethane diisocyanate, naphthylene 1,5-diisocyanate or xylylene diisocyanate. Of these, particular preference is given to 2,2'-, 2,4'- and also 4,4'-diphenylmethane diisocyanates. In general, the latter diisocyanates are used as a mixture. The diisocyanates may also comprise minor amounts, for example up to 5% by weight, based on the total weight, of urethione groups, for example for capping the isocyanate groups.

The term "aliphatic diisocyanate" herein refers particularly to linear or branched alkylene diisocyanates or cycloalkylene diisocyanates having 2 to 20 carbon atoms, preferably 3 to 12 carbon atoms, for example 1,6-hexamethylene diisocyanate, isophorone diisocyanate or methylenebis(4-isocyanatocyclohexane). Particularly preferred aliphatic diisocyanates are isophorone diisocyanate and, in particular, 1,6-hexamethylene diisocyanate.

The preferred isocyanurates include the aliphatic isocyanurates which derive from alkylene diisocyanates or cycloalkylene diisocyanates having 2 to 20 carbon atoms, preferably 3 to 12 carbon atoms, for example isophorone diisocyanate or methylenebis(4-isocyanatocyclohexane). The alkylene diisocyanates here may be either linear or branched. Particular preference is given to isocyanurates based on n-hexamethylene diisocyanate, for example cyclic trimers, pentamers or higher oligomers of 1,6-hexamethylene diisocyanate.

2,2'-Bisoxazolines are generally obtainable via the process from Angew. Chem. Int. Ed., Vol. 11 (1972), pp. 287-288. Particularly preferred bisoxazolines are those in which $R^1$ is a single bond, a $(CH_2)_z$ alkylene group, where z=2, 3 or 4, such as methylene, 1,2-ethanediyl, 1,3-propanediyl, 1,2-propanediyl or a phenylene group. Particularly preferred bisoxazolines are 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene.

The number average molecular weight (Mn) of polyesters I is generally in the range from 5000 to 100 000, particularly in the range from 10 000 to 75 000 g/mol, preferably in the range from 15 000 to 50 000 g/mol, their weight average molecular weight (Mw) is generally in the range from 30 000 to 300 000, preferably 60 000 to 200 000 g/mol, and their Mw/Mn ratio is generally in the range from 1 to 6, preferably in the range from 2 to 4. The viscosity number is between 30 and 450 g/mL and preferably in the range from 50 to 400 g/mL (measured in 50:50 w/w o-dichlorobenzene/phenol). The melting point is in the range from 85 to 150° C. and preferably in the range from 95 to 140° C.

Polyesters I generally have a melt volume rate (MVR) to EN ISO 1133 (190° C., 2.16 kg weight) of 0.5 to 10.0 cm$^3$/10 min and preferably of 0.8 to 5 cm$^3$/10 min.

Polyesters II have the following composition:
- a-2) 40 to 70 mol %, based on components a and b, of an aliphatic $C_4$-$C_6$-dicarboxylic acid or of a $C_4$-$C_6$-dicarboxylic acid derivative;
- b-2) 30 to 60 mol %, based on components a and b, of terephthalic acid or of a terephthalic acid derivative;
- c-2) 98 to 100 mol %, based on components a and b, of a $C_3$-$C_6$ diol;
- d-2) 0 to 2 wt %, based on the total weight of components a and b, of an at least trihydric alcohol;
- e-2) 0 to 2 wt %, based on the total weight of components a to e, of a chain extender.

The essential difference between polyesters II and polyesters I is the chain length of the dicarboxylic acid (component a). Dicarboxylic acid component a-2 has a shorter chain than dicarboxylic acid component a-1 has. $C_4$-$C_6$ Dicarboxylic acid refers to succinic acid, glutaric acid and particularly preferably adipic acid. The dicarboxylic acids succinic acid and adipic acid these days are obtainable from renewable raw materials. The rest of the polyester II definitions b-2, c-2, d-2 and e-2 correspond to the definitions b-1, c-1, d-1 and e-1 which were given above for polyester I.

Polyesters II are obtainable for example by the methods described above. Optionally, polyesters II are obtainable using less or no chain extender e. Milder reaction conditions or shorter reaction times can also be established in the above-described process known from WO 2009/127556 in order that a melt volume rate (MVR) to EN ISO 1133 (190° C., 2.16 kg weight) of for example 0.5 to 10.0 cm$^3$/10 min may be realized.

Partly aromatic polyesters II are more particularly poly(butylene adipate-co-terephthalate) (PBAT). Commerical PBAT products such as Ecoflex® F(BASF SE) and Eastar® Bio, OrigoBi® (Novamont) are preferred polyesters II.

The improved biodegradability in the soil is obtained in particular when polyester I forms the continuous or co-continuous phase in the polyester mixture of the present invention, and/or the mixing ratio of polyester I to polyester II is as follows.

Preference is therefore given to polyester mixtures comprising from 50 to 95 wt %, more preferably from 65 to 95 wt % and even more preferably from 70 to 90 wt %, based on components i and ii, of polyester I and from 5 to 50 wt %, more preferably from 5 to 35 wt % and even more preferably from 10 to 30 wt %, based on components i and ii, of polyester II.

In the claimed mixing ratio, the polymer mixture of the present invention displays an improved DIN EN ISO 17556 soil biodegradability over the respective individual components: polyester I and polyester II.

In general, polyesters I have a higher DIN EN ISO 17566 soil biodegradability than polyesters II. Surprisingly, the polymer mixtures of the present invention which comprise 70-90 wt %, based on components i and ii, of polyester i) and 10-30 wt %, based on components i and ii, degrade faster than polyesters I.

The addition of polyester II to the mixtures of the present invention further leads to an improvement in penetration resistance. This effect is particularly pronounced in filled polyester mixtures utilizing an additional 5 to 25 wt %, based on the total weight of the polymer mixture, of polylactic acid.

Excellent tongue tear strength and high penetration resistance is observed with polymer mixtures whose polyesters I having a melt volume rate (MVR) to EN ISO 1133 (190° C., 2.16 kg weight) of 0.5 to 2.0 cm$^3$/10 min and polyesters II having a melt volume rate (MVR) to EN ISO 1133 (190° C., 2.16 kg weight) of 2.5 to 10.0 cm$^3$/10 min and from 10 to 35 wt %, based on the total weight of the polymer mixture, of fillers such as, preferably, calcium carbonate and talc.

The polyester mixture may accordingly comprise still further ingredients. The polyester mixture including all further ingredients is hereinbelow referred to as polymer mixture.

Calcium carbonate may be used for example at 10 to 25 wt %, preferably 10 to 20 wt % and more preferably 12 to 18 wt %, based on the total weight of the polymer mixture. Calcium carbonate from Omya will prove suitable inter alia. The average particle size of calcium carbonate is generally in the range from 0.5 to 10 micrometers, preferably 1-5 and more preferably 1-2.5 micrometers.

Talc may be used for example at 3 to 15 wt %, preferably 3 to 10 wt % and more preferably 5 to 8 wt %, based on the total weight of the polymer mixture. Talc from Mondo Minerals will be found suitable inter alia. The average particle size of talc is generally 0.5-10, preferably 1-8 and more preferably 1-3 micrometers.

Still further minerals may be present in addition to the fillers calcium carbonate and talc: graphite, gypsum, carbon black, iron oxide, calcium chloride, kaolin, silicon dioxide (quartz), sodium carbonate, titanium dioxide, silicate, wollastonite, mica, montmorillonites, mineral fibers and natural fibers.

Natural fibers are generally cellulose fibers, kenaf fibers, hemp fibers, wood flour or potato peel. They are preferably used at 1 to 20 wt % based on the polymer mixture.

The minerals including the fillers calcium carbonate and talc can also be used in the form of nanofillers. Nanofillers are particularly finely divided sheet-silicates, preferably clay minerals and more preferably montmorillonite comprising clay minerals, the surface of which are modified with one or more quaternary ammonium salts and/or phosphonium salts and/or sulfonium salts. Natural montmorillonites and bentonites are preferred clay minerals.

Altogether, the polyester mixtures may comprise for example fillers at 10 to 35 wt %, based on the total weight of the polymer mixture.

In a preferred embodiment, the polyester mixtures may have added to them still further polymers selected from the group consisting of polylactic acid (PLA), polycaprolactone (PCL), polyhydroxyalkanoate, starch or polyester prepared from aliphatic dicarboxylic acids and an aliphatic dihydroxy compound.

Polylactic acid is preferably added at 5 to 25 wt % and more preferably at 6 to 12 wt %, based on the total weight of the polymer mixture.

The use of PLA having the following range of properties is preferred:
a melt volume rate (MVR) to EN ISO 1133 (190° C., 2.16 kg weight) of 0.5 to 30 especially 2 to 40 cm$^3$/10 min;
a melting point below 240° C.;
a glass transition temperature (Tg) above 55° C.;
a water content of below 1000 ppm;
a residual (lactide) monomer content of below 0.3%;
a molecular weight of above 80 000 daltons.

Examples of preferred polylactic acids are Ingeo® 8052D, 6201D, 6202D, 6251D, 3051D and especially Ingeo® 4020D, 4032D or 4043D polylactic acid (from NatureWorks).

Adding PLA in the claimed proportion provides a further distinct improvement in the properties of the polyester film (penetration resistance and tongue tear strength) obtained from the polymer mixture. Mixtures of easy-flowing and more viscous PLA can also be used.

Aliphatic polyesters may further preferably be used at 5 to 45 wt %, based on the total weight of the polymer mixture.

The term "aliphatic polyesters" also comprehends polyesters formed from aliphatic diols and aliphatic dicarboxylic acids such as polybutylene succinate (PBS), polybutylene adipate (PBA), polybutylene succinate adipate (PBSA), polybutylene succinate sebacate (PBSSe), polybutylene sebacate (PBSe) or corresponding polyesters having a polyesteramide or polyesterurethane sub-structure. Aliphatic polyesters are marketed for example by the companies Showa Highpolymers and Mitsubishi under the names Bionolle and GSPla respectively. More recent developments are described in WO-A 2010/034711.

Similar effects are found on adding from 10 to 35 wt %, based on the total weight of the polymer mixture, of a polyhydroxyalkanoate or starch to the polyester films.

Polyhydroxyalkanoates are primarily poly-4-hydroxybutyrates and poly-3-hydroxybutyrates and copolyesters of the aforementioned polyhydroxybutyrates with 3-hydroxyvalerate, 3-hydroxyhexanoate and/or 3-hydroxyoctanoate. Poly-3-hydroxybutyrates are available for example from PHB Industrial under the tradename Biocycle® and from Tianan under the name Enmat®. Poly(3-hydroxybutyrate-co-4-hydroxybutyrate)s are known from Metabolix in particular. They are marketed under the brand name Mirel®.

Poly(3-hydroxybutyrate-co-3-hydroxyhexanoate)s are known from P&G or Kaneka.

Poly(3-hydroxybutyrate-co-3-hydroxyhexanoate)s generally have a 3-hydroxyhexanoate content of 1 to 20 and preferably 3 to 15 mol % based on the polyhydroxyalkanoate. The molecular weight Mw of polyhydroxyalkanoates is generally in the range from 100 000 to 1 000 000 and preferably in the range from 300 000 to 600 000.

Starch also comprehends amylose; thermoplasticized is to be understood as meaning surface modified (see EP-A 937120, EP-A 947559, EP-A 965615) or else thermoplasticized with plasticizers such as glycerol, sorbitol or water for example (see EP-A 539 541, EP-A 575 349, EP-A 652 910).

The polyester mixture of the present invention may further comprise further additives known to a person skilled in the art, for example the materials customarily added in plastics technology such as stabilizers; nucleating agents; glide and release agents such as stearates (especially calcium stearate); plasticizers such as, for example, citric esters (particularly tributyl acetylcitrate), glyceric esters such as triacetylglycerol or ethylene glycol derivatives, surfactants such as polysorbates, palmitates or laurates; waxes such as, for example, erucamide, stearamide or behenamide, beeswax or beeswax esters; antistat, UV absorbers; UV stabilizers; antifoggants; or dyes. The additives are used at concentrations of 0 to 2 wt %, especially 0.1 to 2 wt % based on the polyester mixture of the present invention. Plasticizers may be present in the polyester mixture of the present invention at 0.1 to 10 wt %.

By way of UV absorber it is preferable to use from 0.1 to 1.5 wt % and more preferably from 0.5 to 1.2 wt %, based on the total weight of the polymer mixture, of 2-(4,6-bis-biphenyl-4-yl-1,3,5-triazin-2-yl)-5-(2-ethyl-(n)-hexyloxy)phenol. Preparation and properties of said UV absorber vi are known from WO 2009/071475. WO 2009/071475 is hereby expressly incorporated in this context by reference.

The polymer mixtures, especially the mixtures comprising polylactic acid, may also incorporate from 0 to 1 wt %, preferably from 0.01 to 0.8 wt % and more preferably from 0.05 to 0.5 wt %, based on the total weight of components i to vi, of an epoxy-containing copolymer based on styrene, acrylic ester and/or methacrylic ester. The units which bear epoxy groups are preferably glycidyl (meth)acrylates. Copolymers having a glycidyl methacrylate content of above 20, more preferably of above 30 and even more preferably of above 50 wt % of the copolymer will be found particularly advantageous. The epoxy equivalent weight (EEW) of these polymers is preferably in the range from 150 to 3000 and more preferably in the range from 200 to 500 g/equivalent. The weight-average molecular weight $M_w$ of the polymers is preferably in the range from 2000 to 25 000 and particularly in the range from 3000 to 8000. The number-average molecular weight $M_n$ of the polymers is preferably in the range from 400 to 6000 and particularly in the range from 1000 to 4000. The polydispersity (Q) is generally in the range between 1.5 and 5. Epoxy-containing copolymers of the abovementioned type are commercially available, for example from BASF Resins B.V. under the Joncryl® ADR brand. Joncryl® ADR 4368 is particularly suitable. Component v is used in PLA-containing polyester mixtures in particular.

A preferred embodiment is directed to biodegradable polyester mixtures of the following composition:
i) 45 to 95 wt %, preferably 50 to 95 wt %, more preferably 65 to 95 wt % and even more preferably 70 to 90 wt %, based on components i and ii, of a polyester I;
ii) 5 to 55 wt %, preferably 5 to 50 wt %, more preferably 5 to 35 wt % and even more preferably 10 to 30 wt %, based on components i and ii, of a polyester II;
iii) 10 to 25 wt %, based on the total weight of the components i to vi, of calcium carbonate;
iv) 3 to 15 wt %, preferably 3 to 10 wt %, based on the total weight of components i to vi, of talc;
v) 0 to 50 wt %, preferably 5 to 45 wt %, based on the total weight of components i to vi, of one or more polymers selected from the group consisting of polylactic acid, polycaprolactone, polyhydroxyalkanoate, starch or polyester prepared from aliphatic dicarboxylic acids and an aliphatic dihydroxy compound; particular preference is given to the range from 5 to 25 wt %, based on the total weight of components i to vi, of polylactic acid;
vi) 0 to 2 wt %, preferably 0.1 to 1.5 wt %, based on the total weight of components i to vi, of one or more stabilizer, nucleating agent, glide and release agent, surfactant, wax, antistat, antifoggant, dye, pigment, UV absorber, UV stabilizer or other plastics additive, particular preference being given to the UV-absorber 2-(4,6-bis-biphenyl-4-yl-1,3,5-triazin-2-yl)-5-(2-ethyl-(n)-hexyloxy) phenol.

For the purposes of the present invention, a polymer mixture satisfies the "biodegradable in soil" feature when, in accordance with DIN EN ISO 17556, its percentage degree of biodegradation in 2 years is not less than 90%. It is additionally necessary to test the eco-toxicology of the products used and to comply with the heavy-metal limits (see Vicotte's "ok biodegradable soil" certification). Ultimate aerobic biodegradation in soil can be measured by measuring the oxygen requirements in a respirometer or the amount of carbon dioxide generated—absolutely or relatively to cellulose.

The general effect of biodegradability is that the polyesters or polyester mixtures are converted into carbon dioxide, water and biomass within a reasonable and verifiable interval. Degradation may be effected enzymatically, hydrolytically, oxidatively and/or through agency of electromagnetic radiation, for example UV radiation, and may be predominantly due to the agency of microorganisms such as bacteria, yeasts, fungi and algae.

Biodegradability in the sense of compostability is quantifiable, for example, by polyesters being mixed with compost and stored for a certain length of time. According to DIN EN 13432 (which makes reference to ISO 14855) for example, $CO_2$-free air is flowed through ripened compost during composting and the ripened compost subjected to a defined temperature program. Biodegradability here is defined via the ratio of the net $CO_2$ release from the sample (after deduction of the $CO_2$ released by the compost without sample) to the maximum amount of $CO_2$ releasable by the sample (reckoned from the carbon content of the sample), as a percentage degree of biodegradation. Biodegradable polyesters/polyester mixtures typically show clear signs of degradation, such as fungal growth, cracking and holing, after just a few days of composting. Other methods of determining biodegradability are described in ASTM D 5338 and ASTM D 6400-4 for example.

The biodegradable polyester mixtures referred to at the beginning are useful in the manufacture of nets and wovens, tubular film, chill roll film with and without orientation in a further operation, with and without metallization or SiOx coating.

The polyester mixtures defined at the beginning, comprising components i) to vi), are particularly useful for tubular film and stretch wrapping film. Possible applications here are bottom gusset bags, side seam bags, grip hole carrier bags, shrink labels or vest type carrier bags, inliners, heavy-duty bags, freezer bags, composting bags, agricultural film (mulch film), film bags for packaging food items, peelable closure film—transparent or opaque—weldable closure film—transparent or opaque—sausage casing, salad film, keep-fresh film (stretch wrapping film) for fruit and vegetables, meat and fish, stretch wrapping film for wrapping pallets, film for nets, packaging film for snacks, confectionary bars and muesli bars, peelable lid films for dairy packaging (yogurt, cream, etc.), fruit and vegetables, semi-rigid packaging for smoked sausage and for cheese.

Single- or multi-ply tubular, cast or press film extruded from the polyester mixtures comprising components i to vi) have a distinctly higher tensile strength (as per EN ISO 6383-2:2004) than when extruded from mixtures without components iii to v). Tongue tear strength is a very important property of products particularly in the field of thin (tubular) film for, for example, biowaste bags or thin-wall carrier bags (e.g., vest type carrier bags, fruit bags). Tongue tear strength is also very important for mulch film in the agrisector.

The polyester mixtures comprising components i to vi) are also useful for foam applications such as, for example, for soil aeration, for flowerpots or for receptacles for seedlings.

Polyester films comprising UV absorber (vi) 2-(4,6-bis-biphenyl-4-yl-1,3,5-triazin-2-yl)-5-(2-ethyl-(n)-hexyloxy) phenol are more particularly used for applications which are destined for the outdoor sector such as building construction and especially for agriproducts. Agriproducts are mulch films, covering films, silo films, slit film tapes, wovens, nonwovens, clips, textiles, threads, fishing nets, secondary packaging, such as heavy-duty bags for, for example, peat, fertilizer, cement, crop protection agents, seed or flowerpots.

Agriproducts are generally exposed to wind and weather and especially sunlight. They have to be stabilized to ensure a defined service life in the field.

Performance-related measurements:

Molecular weights Mn and Mw of partly aromatic polyesters were determined as per DIN 55672-1 using hexafluoroisopropanol (HFIP)+0.05 wt % of potassium trifluoroacetate for elution. Narrowly distributed polymethyl methacrylate standards were used for calibration. Viscosity numbers were determined according to DIN 53728 Part 3, Jan. 3, 1985, Capillary viscometry. An M-II type Ubbelohde microviscometer was used. The solvent used was 50/50 (w/w) phenol/o-dichlorobenzene.

Describe method used to determine MVR (necessary particulars/differences regarding implementation of EN ISO 1133 (190° C., 2.16 kg weight).

Tongue tear strength was determined via an Elmendorf test as per EN ISO 6383-2:2004 on test specimens of constant radius (43 mm tear length) using a ProTear instrument.

Modulus of elasticity and elongation at break were determined in an ISO 527-3 tensile test on blown film about 30 μm in thickness.

ASTM D 1709 dart drop test method A was applied to film 30 μm in thickness to determine the maximum energy needed for the dart dropping onto the film to pass through the film. This energy is expressed in terms of the weight of the dart in g which is dropped onto the film from a certain height and leads to a 50 percent failure (see ASTM in annex).

Degradation rates of biodegradable polyester mixtures and of comparative mixtures were determined in accordance with DIN EN ISO 17556 (1 Dec. 2012):

During the aerobic biodegradation, the substrate was converted into carbon dioxide, water and biomass by microbial activity. The test method described here permits quantitative tracking of the biodegradation of polymer samples in soil.

The inoculum consisted of a mixture of natural soils after removal of coarse constituents with a 2 mm sieve. The water content of the inoculum was adjusted to 40-60% of the maximum water-holding capacity of the soil mixture. The pH was between 6 and 8, more particularly equal to 7.2. The polymer sample (powder) was directly mixed with the inoculum (1 g of polymer per 500 g of soil) and placed in the reactor. The reactor contained not only a vessel with potassium hydroxide solution to absorb the generated carbon dioxide but also a vessel with water to prevent drying out of the soil. The reactor was sealed airtight and stored in the dark at 25° C.

The amount of generated carbon dioxide was determined by titration. After every titration, the potassium hydroxide solution was renewed and the soil commixed and, if necessary, moistened.

Biodegradation was computed from the amount of carbon dioxide generated. For this, it was merely necessary to allow for the background emission (carbon dioxide production of the inoculum without polymer sample: blank test) and to know the total organic carbon (TOC) content of the polymer sample.

I. Materials Used:

i-1 Poly(butylene sebacate-co-terephthalate)

Dimethyl terephthalate (70.11 kg), 1,4-butanediol (90.00 kg), glycerol (242.00 g), tetrabutyl orthotitanate (TBOT) (260.00 g) and sebacic acid (82.35 kg) were initially charged to a 250 L tank and the apparatus was purged with nitrogen. Methanol was distilled off up to an internal temperature of 200° C. After cooling down to about 160° C., the mixture was condensed in vacuo (<5 mbar) at up to an internal temperature of 250° C. Attainment of the desired viscosity was followed by cooling to room temperature. The prepolyester had a viscosity number of 80 mL/g. Chain extension was carried out in a Rheocord 9000 Haake kneader having a Rheomix 600 attachment. The prepolyester was melted at 220° C. and the melt was admixed with 0.9 wt %, based on polyester I, of HDI (hexamethene diisocyanate) by dropwise addition. Reaction progress was tracked by observing the torque. The reaction mixture was cooled down after attainment of the maximum torque, and the chain-extended biodegradable polyester was removed and characterized. Polyester i-1 had an MVR of 1.0 cm$^3$/10 min.

i-2 Poly(butylene sebacate-co-terephthalate)

The prepolyester was prepared similarly to Example 1 and admixed with 0.3 wt % of HDI (hexamethene diisocyanate). Polyester i-2 had an MVR of 4.6 cm$^3$/10 min.

ii-1 Poly(butylene adipate-co-terephthalate)

To prepare polyester ii-1, 87.3 kg of dimethyl terephthalate, 80.3 kg of adipic acid, 117 kg of 1,4-butanediol and 0.2 kg of glycerol were mixed together with 0.028 kg of tetrabutyl orthotitanate (TBOT), the molar ratio between the alcohol components and the acid component being 1.30. The reaction mixture was heated to a temperature of 180° C. and reacted at that temperature for 6 h. The temperature was subsequently raised to 240° C. and excess dihydroxy compound was distilled off in vacuo over a period of 3 h. This was followed by the gradual metered addition at 240° C. of 0.9 kg of hexamethylene diisocyanate in the course of 1 h.

Polyester ii-1 thus obtained had a melting temperature of 119° C. and an MVR of 3.1 cm$^3$/10 min.

iii-1) Calcium carbonate of the type "Omyafilm 764 OM" from OMYA iv-1) Talc of the type "Microtalk IT extra" from Mondo Minerals v-1) Polylactic acid (PLA) Ingeo® 4043D from Natureworks LLC v-2) Polylactic acid (PLA) Ingeo® 8052D from Natureworks LLC vi-1) Batch A: 20 wt % masterbatches of Joncryl ADR 4368 in polyester ii-1 (see EP-A 1838784 for preparation)

II. Compounding

The polymer mixtures of Examples 1 to 4 and Comparative Examples V1 to V3a were mixed in the quantitative ratios reported in Tables 1 and 2 and compounded on a Coperion ZSK40 MC extruder with L/D 44 and 11 zones. The barrel temperatures are between 180 and 210° C. and melt temperature is between 240 and 270° C. Components i-1, ii-1, v-1 and vi-1 were cold-fed into zone 1, component iii-1 was side-fed into zone 8 and component iv-1 was side-fed into zone 5. Screw speed, throughput and all other process parameters were appropriately optimized for the compounds.

III. Film Production:

Blown Film Line

The tubular film line was operated with a 25 D length extruder having a 30 mm screw and equipped with a smooth feed section and a three-zone screw. The feed section was cooled with about 10-15 kg/h of cold water at maximum throughput. Zone temperatures were chosen such that melt temperature was between 170 and 190° C. Die temperatures were in the range of 160-180° C. Die diameter was 80 mm, die width was 0.8 mm. The blow-up ratio of 3.5:1 resulted in a lay-flat width of about 440 mm for the tubular film.

IV. Results

TABLE 1

Tongue tear strength and dart drop of films 30 μm in thickness

| | Example | | | | | | |
|---|---|---|---|---|---|---|---|
| | 1 | 2 | 3 | 4 | V1 | V2 | V3 |
| i-1 [wt %] | 64.35 | 57.2 | 52.5 | 41.5 | 28.6 | — | — |
| i-2 [wt %] | — | — | — | — | — | — | 71.5 |
| ii-1 [wt %] | 7.15 | 14.3 | 19 | 30 | 42.9 | 71.5 | — |
| ii-1 proportion* | 10 | 20 | 26.6 | 42 | 60 | 100 | 0 |
| iii-1 [wt %] | 14 | 14 | 14 | 14 | 14 | 14 | 14 |
| iv-1 [wt %] | 6 | 6 | 6 | 6 | 6 | 6 | 6 |
| v-1 [wt %] | 8 | 8 | 8 | 8 | 8 | 8 | 8 |
| vi-1 [wt %] | 0.5 | 0.5 | 0.5 | 0.5 | 0.5 | 0.5 | 0.5 |
| Film thickness [μm] | 30 | 30 | 30 | 30 | 30 | 30 | 30 |
| Tongue tear strength at 800 g along [mN] | 6052 | 5815 | 5948 | 4585 | 3321 | 1743 | 4154 |
| across [mN] | 4772 | 3499 | 3615 | 2680 | 1660 | 1933 | 5937 |
| Dart drop method A [g] | 172.5 | 194.3 | 184.5 | 189.0 | 208.5 | 304.5 | 153.0 |

*proportion of component ii-1 as a proportion of the total weight of components i and ii The tests show that filled polyesters II (see V2) have very good penetration resistance (dart drop), while filled polyesters I (see V3) have very good tongue tear strength. The polyester mixtures of the present invention (see Examples 1 to 4) have both very good tongue tear strength and good penetration resistance (dart drop).

TABLE 2

Soil degradation of ground polymeric powders to DIN EN ISO 17556 measured by carbon dioxide generated

| Example | 3 | V3-a | Cellulose (reference) |
|---|---|---|---|
| i-1 [wt %] | 52.5 | 71.5 | |
| i-2 [wt %] | — | — | |
| ii-1 [wt %] | 19 | — | |
| ii-1 proportion* | 26.6 | 0 | |
| iii-1 [wt %] | 14 | 14 | |
| iv-1 [wt %] | 6 | 6 | |
| v-1 [wt %] | 8 | 8 | |
| vi-1 [wt %] | 0.5 | 0.5 | |
| Particle size <100 μm | | | |
| Degradation after 180 days | 58.30% | 45.50% | 86.2% |

*proportion of component ii-1 as a proportion of the total weight of components i and ii Polyesters I have faster soil degradability than polyesters II. It was all the more surprising that the inventive mixture of a polyester I and a polyester II degrades even distinctly faster in soil than polyester I and hence has superior soil degradability to either of the two individual components.

We claim:
1. A biodegradable polyester mixture comprising:
   i) 45 to 95 wt %, based on the total weight of components i and ii, of a polyester I constructed from:
      a-1) 40 to 70 mol %, based on components a and b, of an aliphatic $C_9$-$C_{18}$ dicarboxylic acid or of a $C_9$-$C_{18}$ dicarboxylic acid derivative;
      b-1) 30 to 60 mol %, based on components a and b, of terephthalic acid or of a terephthalic acid derivative;
      c-1) 98 to 100 mol %, based on components a and b, of a $C_3$-$C_6$ diol;
      d-1) 0 to 2 wt %, based on the total weight of components a to e, of an at least trihydric alcohol; and
      e-1) 0 to 2 wt %, based on the total weight of components a to e, of a chain extender;
   ii) 5 to 55 wt %, based on the total weight of components i and ii, of a polyester II constructed from:
      a-2) 40 to 70 mol %, based on components a and b, of an aliphatic $C_4$-$C_6$ dicarboxylic acid or of a $C_4$-$C_6$ dicarboxylic acid derivative;
      b-2) 30 to 60 mol %, based on components a and b, of terephthalic acid or of a terephthalic acid derivative;
      c-2) 98 to 100 mol %, based on components a and b, of a $C_3$-$C_6$ diol;
      d-2) 0 to 2 wt %, based on the total weight of components through e, of an at least trihydric alcohol; and
      e-2) 0 to 2 wt %, based on the total weight of components a to e, of a chain extender;
   iii) 10 to 25 wt %, based on the total weight of the polymer mixture i to iv, of calcium carbonate; and
   iv) 3 to 15 wt %, based on the total weight of the polymer mixture i to iv, of talc.
2. The biodegradable polyester mixture according to claim 1 comprising from 0.1 to 1.5 wt %, based on the total weight of the polymer mixture, of one or more than one stabilizer, nucleating agent, glide and release agent, surfactant, wax, antistat, antifoggant, dye, pigment, UV absorber, UV stabilizer, or other plastics additive.
3. A shopping bag, compost bag, or inliner for a biowaste bin comprising the polyester mixture according to claim 1.
4. An agriproduct selected from the group consisting of mulch films, covering films, bead foam for soil aeration, silo films, slit film tapes, wovens, nonwovens, clips, textiles, threads, fishing nets, secondary packaging, heavy-duty bags, and flowerpots, said agriproduct comprising the polyester mixture according to claim 1.
5. The biodegradable polyester mixture according to claim 1 wherein said diacid component a-1 of polyester I is sebacic acid or a sebacic acid derivative.

6. The biodegradable polyester mixture according to claim 5 wherein said diacid component a-2 of polyester II is adipic acid or an adipic acid derivative.

7. The biodegradable polyester mixture according to claim 1 wherein said diacid component a-2 of polyester II is adipic acid or an adipic acid derivative.

8. The biodegradable polyester mixture according to claim 7 further comprising an added 0 to 50 wt %, based on the total weight of the polymer mixture, of one or more polymers v) selected from the group consisting of polylactic acid, polycaprolactone, polyhydroxyalkanoate, starch, and polyester prepared from an aliphatic dicarboxylic acid and an aliphatic dihydroxy compound.

9. The biodegradable polyester mixture according to claim 8 further comprising from 5 to 45 wt %, based on the total weight of the polymer mixture, of polycaprolactone (PCL) or of an aliphatic polyester selected from the group consisting of polybutylene succinate (PBS), polybutylene adipate (PBA), polybutylene succinate adipate (PBSA), polybutylene succinate sebacate (PBSSe), polybutylene sebacate (PBSe), polyethylene succinate (PES) and polycaprolactone (PCL).

10. The biodegradable polyester mixture according to claim 9 comprising from 0.1 to 1.5 wt %, based on the total weight of the polymer mixture, of one or more than one stabilizer, nucleating agent, glide and release agent, surfactant, wax, antistat, antifoggant, dye, pigment, UV absorber, UV stabilizer, or other plastics additive.

11. The biodegradable polyester mixture according to claim 1 further comprising an added 0 to 50 wt %, based on the total weight of the polymer mixture, of one or more polymers v) selected from the group consisting of polylactic acid, polycaprolactone, polyhydroxyalkanoate, starch, and polyester prepared from an aliphatic dicarboxylic acid and an aliphatic dihydroxy compound.

12. The biodegradable polyester mixture according to claim 11 further comprising from 5 to 45 wt %, based on the total weight of the polymer mixture, of polycaprolactone (PCL) or of an aliphatic polyester selected from the group consisting of polybutylene succinate (PBS), polybutylene adipate (PBA), polybutylene succinate adipate (PBSA), polybutylene succinate sebacate (PBSSe), polybutylene sebacate (PBSe), polyethylene succinate (PES) and polycaprolactone (PCL).

13. The biodegradable polyester mixture according to claim 12 comprising from 0.1 to 1.5 wt %, based on the total weight of the polymer mixture, of one or more than one stabilizer, nucleating agent, glide and release agent, surfactant, wax, antistat, antifoggant, dye, pigment, UV absorber, UV stabilizer, or other plastics additive.

14. The biodegradable polyester mixture according to claim 11 further comprising from 5 to 45 wt %, based on the total weight of the polymer mixture, of starch and/or of a polyhydroxyalkanoate.

15. The biodegradable polyester mixture according to claim 11 further comprising from 5 to 25 wt %, based on the total weight of the polymer mixture, of polylactic acid.

\* \* \* \* \*